United States Patent [19]

Hishiki

[11] Patent Number: 4,944,000

[45] Date of Patent: Jul. 24, 1990

[54] SEMICONDUCTOR INTEGRATED CIRCUIT FOR A TELEPHONE DIALER INCLUDING A WAIT-PAUSE CIRCUIT

[75] Inventor: Yuji Hishiki, Tokyo, Japan

[73] Assignee: Seiko Instruments Inc., Japan

[21] Appl. No.: 283,162

[22] Filed: Dec. 12, 1988

[30] Foreign Application Priority Data

Dec. 15, 1987 [JP] Japan ................... 62-316481

[51] Int. Cl.$^5$ .......................................... H04M 1/274
[52] U.S. Cl. ..................................... 379/359; 379/362
[58] Field of Search ................ 379/302, 359, 356, 361

[56] References Cited

U.S. PATENT DOCUMENTS 4,342,882   8/1982   Gravenhorst et al. ............. 379/359

Primary Examiner—Stafford D. Schreyer
Attorney, Agent, or Firm—Bruce L. Adams; Van C. Wilks

[57] ABSTRACT

The dialer IC according to the present invention is capable of expanding an access-pause of the push-button telephone and adapting itself to a wide variety of dialing services.

7 Claims, 2 Drawing Sheets

FIG. 3.

| 1 | 2 | 3 | T | $M_1$ |
|---|---|---|---|---|
| 4 | 5 | 6 | F | $M_2$ |
| 7 | 8 | 9 | P | $M_3$ |
| ✶ | 0 | ♯ | RD | $M_4$ |

SEMICONDUCTOR INTEGRATED CIRCUIT FOR A TELEPHONE DIALER INCLUDING A WAIT-PAUSE CIRCUIT

BACKGROUND OF THE INVENTION

The present invention relates to a telephonic semiconductor integrated circuit (hereinafter referred to as a dialer IC) for use with a push-button telephone.

As illustrated in FIG. 2, a prior art dialer IC does not include a wait-pause detecting circuit and a status output circuit. The access pause is based on only the connection from an extension line to an exchange line.

Japanese Patent Publication No. 546322 (Japanese Registered Patent No. 976312) describes that a wait-button is provided to store an access-pause in a memory by depressing the wait-button following the depression of the 0-button.

When performing access to, e.g., a password-number service in a bank by employing the conventional dialer IC, the time required for obtaining a password-number receivable state when the line has been connected is different from an ordinary access pause. Therefore, where the password-number service is accessed by using an abbreviated number, there arises such a defect that the respective sets of numbers are independently employed as abbreviated numbers; or alternatively, only one number is used as an abbreviated number, while the other must be dialed by an ordinary manual operation.

Accordingly, the present invention aims at performing a series of operations by only one abbreviated dialing process. This involves the steps of interposing a wait-pause in a plurality of combinations of numbers and outputting the state of wait-pause to the outside.

In the present invention, a button for operations other than the wait-pause can be used as the wait-pause button, therefore the wait-pause button does not have to be specially provided. For example, the button (e.g. T-button) for changing pulse signal into DTMF signal can be used.

SUMMARY OF THE INVENTION

An object of the present invention is to provide a dialer IC which includes a wait-pause detecting circuit; a control circuit for determining a given state in which a specific key code is detected, thereby coming into a wait-pause-state; and a state output circuit for outputting the fact of being in the wait-pause-state.

BRIEF DESCRIPTION OF THE DRAWINGS

FIG. 3 illustrates an arrangement of buttons of a telephone according to the present invention.

DETAILED DESCRIPTION OF THE PREFERRED EMBODIMENTS

Figure 1:
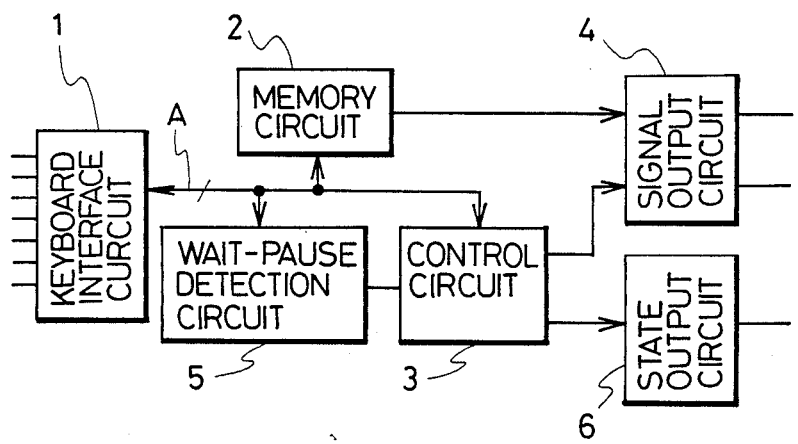
FIG. 1 is a block diagram illustrating a dialer IC according to the present invention.
Figure 2:
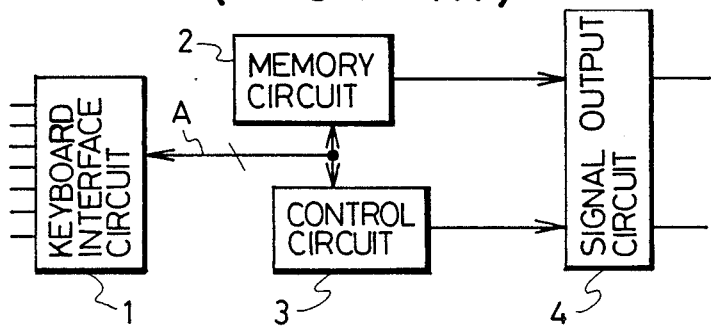
FIG. 2 is a block diagram depicting a conventional dialer IC.

An embodiment of the present invention will hereinafter be described with reference to the accompanying drawings. Referring first to FIG. 1, a keyboard interface circuit generally designated at 1 is connected via a plurality of signal lines A to a memory circuit 2, a control circuit 3 and a wait-pause detecting circuit 5. A signal output circuit 4 reads out the data stored in the memory circuit 2 under control of the control circuit 3. Typically, data are transmitted and received between the individual circuits through the plurality of signal lines A. A state output circuit 6 is connected to the control circuit 3. Immediately after the wait-pause detecting circuit 5 has detected a wait-pause, the control circuit 3 activates the state output circuit 6 to output a wait-pause-state signal. A specific key code (e.g a key code for T-button or key which changes a pulse signal into a DTMF signal), or the specific code in a given state (e.g. a state in which a M1 key is depressed) is allocated to the wait-pause detected by the wait-pause detecting circuit 5. When detecting the wait-pause-state signal, the system is brought into the wait-pause state by means of the control circuit 3. In this wait-pause state, a wait-pause releasing key alone is permissible, and it is therefore convenient to indicate this state to the outside. For this purpose, the state output circuit 6 is utilized, and the wait-pause state is indicated by lighting up an indicator, e.g., an LED.

In the above-described embodiment, the wait-pause detecting circuit 5 may be composed of a simple logical circuit. The control circuit 3 may also involve the use of a relatively easy-to-use logical circuit to obtain the wait-pause state. In connection with the state output circuit 6 also, if a DTMF (a signal of a push-button telephone) and a mode output terminal for pulses are provided, a double-purpose use can be attained.

When performing access from a PBX (Private Branch Exchange) to an outside password-number service by using the thus constructed dialer IC, the exchange line originating number (usually 0), an access pause (e.g. P-button), telephone directory number data, such as the destination number, wait-pause data (e.g. T-button) and additional information number data, such as the password-number, are sequentially registered or stored in the memory circuit 2 (e.g. M1-button) by operating the corresponding buttons. Upon readout of the sequence of data from the memory circuit 2 by the signal output circuit 4 by pushing the M1-button, exchange line sending is at first effected, and the destination number data are sent after the access pause. The sending operation is temporarily interrupted and ceases after coming into the wait-pause-state in response to detection of the wait-pause data by the wait-pause detection circuit 5. Subsequent to confirmation of connection to the destination, the wait-pause is released by pushing the M1-button again, thereby enabling resumption of the sending operation and the sending of the password-number. The sending process is thus completed. Only one wait-pause is provided in the above example. However, it is also possible to provide a plurality of wait-pauses for sending a plurality of data.

As discussed above, the present invention actualizes the dialer IC adaptive to services having a wide variety of access pauses by adding the simple logical circuits, and also exhibits effects of simplifying the operation and providing efficient utilization of the memory.

We claim:

1. A semiconductor integrated circuit for a telephone, comprising:
   a keyboard interface circuit for inputting a sequence of telephone directory number data, wait-pause data and additional information number data;
   a memory circuit for registering the sequence of data and for outputting the registered sequence of data in response to an operating command inputted through the keyboard interface circuit;

a wait-pause detecting circuit for detecting the wait-pause data included in the outputted sequence of data and producing a corresponding detection signal;

a signal output circuit for sending out an electrical signal corresponding to the retrieved sequence of data;

a control circuit responsive to the operating command to control the signal output circuit to transmit a part of the electrical signal corresponding to the telephone directory number data, responsive to the detection signal to stop sending of the remaining part of the electrical signal, and responsive to a release command inputted manually through the keyboard interface circuit upon confirmation of connection to thereby restart sending of the remaining part of the electrical signal corresponding to the retrieved additional information number data;

and a status output circuit connected to the control circuit for indicating when the sending of the electrical signal is temporarily stopped.

2. A semiconductor integrated circuit for a push-button telephone, comprising: a keyboard interface circuit for inputting a sequence of telephone directory number data, wait-pause data and additional information number data; memory means for storing the sequence of data to enable the sequence of data to be read out therefrom; circuit means for reading out the sequence of data from the memory means and for transmitting an electrical signal corresponding to the readout sequence of data; detecting means for detecting the occurrence of the wait-pause data in the sequence of data readout from the memory means and providing a corresponding detection signal; and control means responsive to the detection signal for temporarily interrupting the transmission of the electrical signal between the part thereof which corresponds to the telephone directory number data and the part thereof which corresponds to the additional number data and responsive to a release command manually inputted through the keyboard interface circuit for enabling resumption of the transmission of the electrical signal.

3. A semiconductor integrated circuit according to claim 2; including means for indicating when the transmission of the electrical signal is temporarily interrupted.

4. A semiconductor integrated circuit according to claim 3; wherein the means for indicating comprises means for providing a visual indication.

5. A semiconductor integrated circuit according to claim 2; wherein the control means includes means responsive to an operating command inputted through the keyboard interface circuit to initiate the readout of the sequence of data from the memory means and the transmission of the electrical signal by the circuit means.

6. A semiconductor integrated circuit according to claim 5; including means for indicating when the transmission of the electrical signal is temporarily interrupted.

7. A semiconductor integrated circuit according to claim 6; wherein the means for indicating comprises means for providing a visual indication.

* * * * *